March 8, 1927.  1,620,604

R. SYKORA

METHOD OF PRODUCING RELATIVE COLOR DESIGN

Filed April 22, 1922

INVENTOR:
Rudolf Sykora
by Macleod, Calver, Copeland & Dike
Attys.

Patented Mar. 8, 1927.

1,620,604

UNITED STATES PATENT OFFICE.

RUDOLF SYKORA, OF BOSTON, MASSACHUSETTS.

METHOD OF PRODUCING RELATIVE COLOR DESIGN.

Application filed April 22, 1922. Serial No. 556,072.

This invention relates to a new and useful improvement in method of producing color designs on articles.

It is adapted for application not only to paper but also to other prepared material such as silk or fabric of any kind, to natural surfaces of materials such as wood, leather, etc., imitations and compositions thereof and to substances in a plastic condition and the claims are intended to cover such other material as well as paper.

The invention will be fully understood from the following description when taken in connection with the accompanying drawings, and the novel features thereof will be pointed out and clearly defined in the claims at the close of this specification.

One feature of the invention consists in combining solutions of dyestuffs preferably such as are incompatible and of unlike chemical and dialytic properties and color effects, in such proportions as to neutralize their original color effects without destroying the chromogens, applying this combined solution to an article and then incorporating into the article a substance containing electro-positive and electro-negative ions. The above and other features of the invention will be hereinafter described and particularly pointed out in the claims.

For convenience of illustration, the invention will be particularly described as applied to producing a design on paper.

Figure 1:
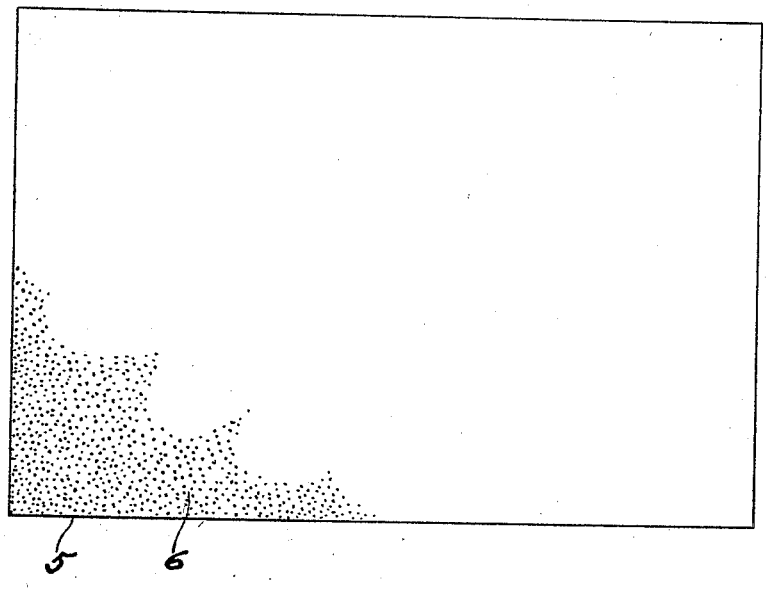
Fig. 1 is a view of a sheet of paper part of which is plain and part of which represents the appearance after the dye solution has been applied.

Referring to the drawings, there is represented at 5 a sheet of paper which is treated in the making of the design according to the invention.

Dyestuffs of different colors are employed which should be separately dissolved in water. The several dissolved dyestuffs are then combined, enough of each solution being used so that the identity of the original color effects of all the dyestuffs are neutralized.

The dyestuffs are selected according to the desired color effects and the material to be treated. In instances where the aggregate of the color molecules assume the state of a coagulum, a certain proportion of a suitable agent, preferably of an acid reaction, will rectify the solution. For instance, sulphuric acid is a suitable rectifying agent.

The sheet 5 is treated with the said compounded solution by means of brushes or by any other suitable means to incorporate the said solution with the material. After the solution has been applied, the sheet will appear as shown in Figure 1, having the characterless, dull surface 6 showing the neutralization of the color effects of the dyes. In cases where it is not desired to cover the entire surface of the material, that is to say, where it is desired to have interrupted portions on the surface on which the color is not to appear, the compounded color solution may be applied by spraying or sprinkling or other intermittent method. This is preferably done by means of a series of nozzles such as described in Patent No. 1,409,259, granted to me March 14, 1922, but other methods may be employed. The material is preferably moistened before the color solution is applied.

The next step is the application of a substance which causes the re-appearance of the colors. By introducing an agent possessing the necessary ionizing property the grouping of the respective dyes in the material will be rearranged so as to be again identified in their color effects. This substance preferably contains electro-positive ions and electro-negative ions which will react with the dye molecules in the article. Preferably sodium, Na, is the electro-positive ion and the hydroxyl (OH) is the electro-negative ion. When combined they form a compound commercially known as sodium hydroxide and this is the preferred substance to use for this purpose, but compounds having similar properties may be employed in place of sodium hydroxide. Preferably the sodium hydroxide solution is applied intermittently.

Figure 2:
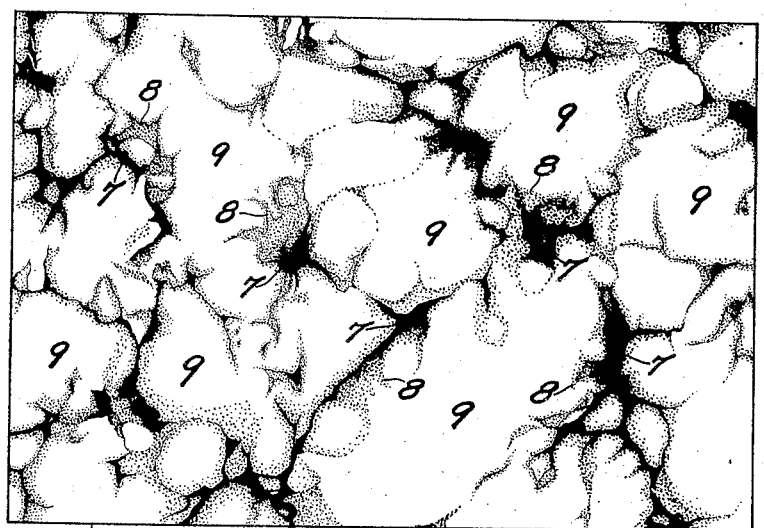
Fig. 2 is a view illustrating the finished product.

When the sodium hydroxide or some other ionizing solution is brought in contact with the material to which the solution of dyestuffs has been applied, the ionizing soluton effects a recovery of the dye colors by ionization, supported by the varying dialytic properties of the dye substances, manifesting an effect of well defined color lines graduating through various shadings into delicate opaqueous blendings, producing a finished product having an appearance of which one form is illustrated in Fig. 2.

The ionizing substance is preferably deposited in drops. At the contact of each drop of the ionizing substance with the treated paper a field of action is created which is most intense at the point of contact indicated at 7 in Fig. 2, and which is least at the periphery of the zones which I term islands, as indicated at 8.

When the sodium hydroxide or some other ionizing substance is applied, the more finely sub-divided ingredients of the color solution retreat toward the center of the field while the coarser ingredients are retained at the periphery.

A distinct feature of the invention is the multiple color effect produced with only one compounded color solution and the thorough incorporation of the dye substances into the material, which in certain instances appear on the other side of the material. This is particularly true as to those color molecules which have a high degree of dialytic property, making the colors very permanent to wear and tear.

A remarkable feature of the process is the mechanical property of carrying to the periphery of the zones comparatively coarse ingredients such as bronze powders which may be introduced into the color solution in a similar manner to that in which the coarse ingredients of the dyestuffs are carried to the periphery as previously described.

The product can be manufactured while it is being made at the mills. The general effect of the product, as presented to the eye, is a design of various colors arranged in a relative order and ranging from well defined lines through various mergings of colors and shadings into opaqueous blendings dimming out into rarefied centers.

When the color design is to be produced upon silk or other cloth fabric, there should be employed a screen, preferably of paper, underneath and in contact with the web of cloth, for the purpose of holding the design after it is formed, as indicated in Patent No. 1,370,070, granted to me March 1, 1921.

Regarding the sequence of application, it is not strictly necessary to follow the order herein described, since the order may be reversed. The order herein described is given as a preferred procedure.

When the word "solution" is employed in the specification and claims, it is intended to be understood in a broad sense, whether the dyestuffs are strictly dissolved or held in suspension.

If other material than paper is being treated by the process, it must be kept in mind that different fibres call for different dyes in the process of dyeing. The proper selection of dyes suitable for coloring the particular fibre used is essential as regards the fixation of the dyes on the fibres, but not as regards the process of the design formation It may finally be stated that on account of the chemically varying fibres, certain material may require preliminary or subsequent treatment such as mordanting the fibre to fix the dyestuff on the material. As regards the cotton fibre, after it has gone through the design formation process hereinbefore described, where basic dyes have been employed, it is preferable to subject the material to a bath in a solution of sodium hydroxide, a suitable formula for which is as follows: Sodium hydroxide, one pound; water, one gallon.

What I claim is:

1. The method of producing a color design on an article consisting of combining solutions of dyestuffs of unlike color effects, applying this solution to the article, and then incorporating into the article a substance containing electro-positive and electro-negative ions.

2. The method of producing a color design on an article consisting of applying to the article a combined solution of dyestuffs of unlike color effects which have been combined in such manner and proportions as to neutralize the original color effects without destroying the chromogens, applying this solution to the article and then incorporating into the article a substance containing electro-positive and electro-negative ions.

3. The method of producing a color design on an article consisting of combining solutions of dyestuffs of unlike color effects in such manner as to neutralize the color effects, applying this solution to the article and then incorporating into the article a solution containing sodium hydroxide.

4. The method of producing a color design on an article consisting of combining solutions of dyestuffs of unlike color effects in such manner and proportions as to neutralize the original color effects, applying this solution to the article and then intermittently applying to the article a substance containing electro-positive and electro-negative ions.

5. The method of producing a color design on an article consisting of combining solutions of dyestuffs of unlike color effects in such manner and proportions as to neutralize the color effects, applying this solution to the article and then applying intermittently to the article a substance containing sodium hydroxide.

6. The method of recovering the colors from a compounded dye solution of different color effects and varying dialytic properties which have been combined in one solution and applied to an article, said method consisting of applying to the article after the said combined solution has been applied thereto, a solution containing an electro-positive ion and (OH) as an electro-negative ion.

7. The method of producing upon an article containing vegetable fibre a design of multiple color effect consisting of applying to the article a compounded solution of dyestuffs of different colors which have been separately dissolved and then combined in a manner to neutralize the colors of the incorporated dyestuffs without destroying the chromogens, then applying to the article a substance containing sodium hydroxide, then subjecting the article to a suitable bath for fixing the dyestuffs.

8. The method of treating an article to produce a color design thereon consisting of applying thereto a compounded solution of dyestuffs of different colors, then subjecting the article to an intermittent dialyzing treatment and then subjecting the article to a bath of sodium hydroxide.

9. The method of treating an article to form a color design and hold the design during its development, said method consisting of treating the material with a compounded dye solution of dyes of different color effects which have been combined in such manner as to neutralize their different color effects without destroying the chromogens, then subjecting the material to an intermittent deposit of sodium hydroxide solution to recover the color effects of the incorporated dyestuffs, then subjecting the material to a bath of sodium hydroxide to fix the design and providing a screen in contact with the material while the design is being developed.

10. The method of producing a color design on an article consisting of combining an acid with solutions of dyestuffs of unlike color effects combined in such manner as to neutralize the original color effects without destroying the chromogens, applying this combined solution to the article and then incorporating into the article a solution containing sodium hydroxide.

In testimony whereof I affix my signature.

RUDOLF SYKORA.